United States Patent [19]
Ohsima

[11] 3,769,761
[45] Nov. 6, 1973

[54] CHUCKING APPARATUS FOR A MACHINE TOOL

[75] Inventor: Susumu Ohsima, Okazaki, Japan

[73] Assignee: Toyoda Koki Kabushiki Kaisha, Kariya-shi, Japan

[22] Filed: July 28, 1972

[21] Appl. No.: 275,919

[30] Foreign Application Priority Data
July 30, 1971 Japan................................ 46/57742

[52] U.S. Cl.................. 51/237 CS, 82/40 A, 279/4, 279/6
[51] Int. Cl....... B24b 5/02, B24b 5/42, B24b 41/06
[58] Field of Search .................... 279/6, 4; 82/40 A; 51/105 SP, 237 CS

[56] References Cited
UNITED STATES PATENTS
| | | | |
|---|---|---|---|
| 3,257,880 | 6/1966 | Hermann | 82/40 A |
| 3,537,215 | 11/1970 | Metz et al. | 51/237 CS |
| 3,404,492 | 10/1968 | Fournier | 51/237 CS |

Primary Examiner—Francis S. Husar
Attorney—Norman F. Oblon et al.

[57] ABSTRACT

In chucking apparatus for a machine tool, such as, for example, a crank pin grinding machine, clamping arms are released a limited distance, relative to a workpiece, during a locating operation, so that the workpiece may be precisely located within the machine's bearing surfaces, in a predetermined angular position by a pressing member relative to a locating stop and reference member. After such locating operation, the clamping arms re-engage the workpiece, thereby fixedly clamping such within the bearing surfaces and readying such for the grinding operation.

6 Claims, 2 Drawing Figures

CHUCKING APPARATUS FOR A MACHINE TOOL

BACKGROUND OF THE INVENTION

The present invention relates generally to chucking apparatus and more particularly to an improved chucking apparatus for a grinding machine for obtaining a high degree of accuracy in positioning a workpiece for the subsequent grinding operation by preventing the disengagement of the workpiece from the bearing surfaces of the apparatus.

As is well known, in performing a grinding operation upon a workpiece, such as, for example, a crank pin of a crank shaft, it is an essential requirement that the axis of the crank pin be precisely aligned with the common axis of the spindles rotatably mounted within the headstock, and the footstock, respectively, which support the chucking apparatus. When the crank shaft is normally loaded upon the bearing surfaces of pot chucks, the axis of the crank pin is not aligned precisely with the common axis of the spindles. It is therefore, necessary to perform a locating operation upon the crank shaft by exerting force upon a reference plane, formed upon a balancing weight portion thereof, by means of a pressing member so as to move the reference plane toward a locating stop member. Thereafter, the journal portions of the crank shaft are clamped upon the bearing surfaces by clamp arms so as to enable commencement of the grinding operation.

However, as the journal portions have to be unclamped relative to the bearing surfaces during the aforementioned locating operation, such journal portions are apt to be disengaged from the bearing surfaces when the reference plane and balancing weight portion are moved by means of the pressing member. The crank shaft will consequently be misaligned from the required angular position, and when the crank shaft is subsequently reclamped upon the bearing surfaces by the clamp arms, the crank shaft is apt to remain as it was, that is, in the deviated or misaligned condition, thereby tending to produce inaccuracies in the locating operation, as well as the subsequent grinding operation to be performed upon the crank pin.

SUMMARY OF THE INVENTION

Accordingly, it is an object of the present invention to provide an improved chucking apparatus for a grinding machine.

Another object of the present invention is to provide chucking apparatus which serves to prevent the disengagement of the crank shaft from the bearing surfaces during the locating operation so as to attain the precise alignment of the axis of the crank pin with the axis of the spindles.

Still another object of the present invention is to provide chucking apparatus which accomplishes the locating operation of the crank pin with a high degree of accuracy.

The foregoing objectives are achieved according to this invention through the provision of a chucking apparatus having a bearing surface upon which is disposed a crank shaft. A clamping arm serves to clamp the crank shaft relative to the bearing surfaces, while a pressing member, in conjunction with a locating stop, serves to accurately align the crank pin of the crank shaft relative to the axis of the supporting spindles during a locating operation in which the clamping arms are retracted a limited distance. At the conclusion of the locating operation, the clamping arms re-engage the crank shaft, whereby such is now ready for the grinding operation.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENT

Figure 1:
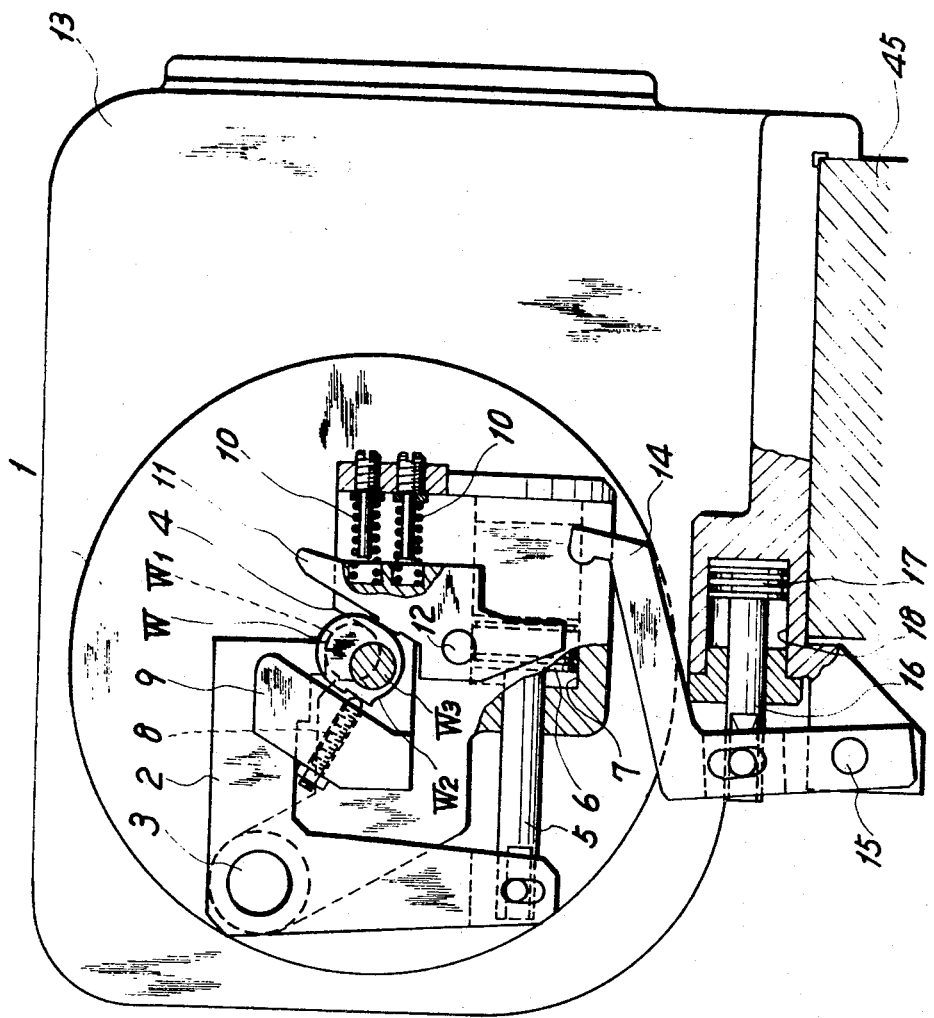
FIG. 1, is a side elevation view, partly in section, of chucking apparatus constructed according to this invention.

Referring now to the drawings, and more particularly to FIG. 1 thereof, a pot chuck 1 is secured to a spindle, not shown, which is rotatably carried by a headstock 13, which, in turn, is mounted upon an indexing table 45 of grinding machine. Pivotably mounted upon the pot chuck 1 by means of a hinge pin 3, is a substantially right-angled clamp arm 2, hinge pin 3 being located at the junction of the legs of clamp arm 2. Clamp arm 2 serves to clamp a crank shaft journal portion $W_1$ of a crank shaft W in a semi-circular bearing surface 4 formed upon the pot chuck 1, in a manner more fully discussed hereinafter.

One end of the clamp arm 2 is connected to a piston rod 5 which extends horizontally from a piston 6 slidably mounted within a cylinder 7 which is formed within a lower portion of pot chuck 1. A locating stop 8 is threadingly engaged within a reference member 9 which is secured within the pot chuck 1 and located within the vicinity of clamp arm 2. The locating stop 8 operatively limits the rotation of the crank shaft W by engaging a reference plane machined upon a balancing weight portion $W_2$ of crank shaft W in order to be able to locate a crank pin portion $W_3$ of crank shaft W in a desired or required angular position.

A pressing member 11, pivotally mounted upon the pot chuck 1 by means of a hinge pin 12, is positioned diametrically opposite reference member 9 relative to crank shaft W. Compression springs 10, 10 serve to push the pressing member 11 toward the balancing weight portion $W_2$ of crank shaft W, while a lever 14, pivotably mounted upon the headstock 13 by means of a hinge pin 15, serves to retract the pressing member 11 away from its engaging position relative to the balancing weight portion $W_2$ of crank shaft W. Also provided within the headstock 13 is a cylinder 18, in which a piston 17, having a horizontally oriented piston rod 16 connected with the lever 14, is slidably mounted.

Figure 2:
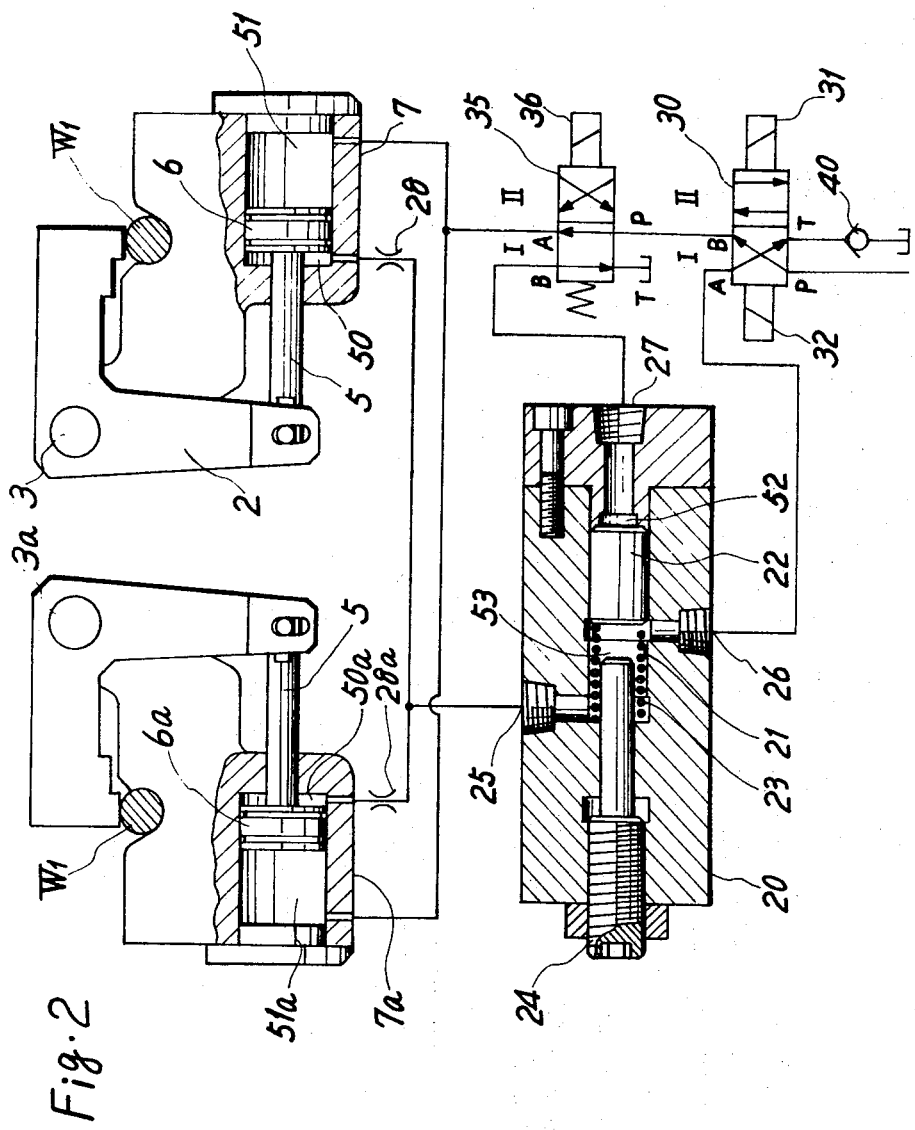
FIG. 2 is a partial schematic diagram showing the hydraulic circuitry for actuating the clamp arms of the apparatus shown in FIG. 1.

Referring now to FIG. 2, a pot chuck identical to the pot chuck 1 described above is mounted upon a footstock, not shown, which is positioned opposite to the headstock 13 upon the indexing table 45, and a clamping device for the pot chuck mounted upon the footstock is illustrated with the same reference character but with a suffix "a". As the pot chuck on the footstock is exactly the same as the pot chuck 1 positioned upon the headstock, in both construction and operation, the description will hereinafter be confined to the pot chuck 1.

A fluid supply valve 20 is provided for supplying a small quantity of pressurized fluid into a left chamber 50 of the cylinder 7 so as to thereby lift the clamping arm 2, by a predetermined short distance, away from the journal portion $W_1$ of the crank shaft W, due to arm 2 pivoting about hinge pin 3. The valve 20 is provided with a cylindrical valve chamber 21 in which a piston 22 is slidably mounted, piston 22 thereby separating the valve chamber 21 into right and left chambers 52 and 53, respectively, and being urged toward the right by a coil spring 23 interposed within chamber 53. An adjustable screw 24, threadably engaged with the valve 20, is axially movable within the valve chamber 21 at one end thereof in order to control the stroke of the piston 22.

Fluid within the left chamber 50 of the cylinder 7 may be exhausted into a reservoir through a valve port 25, the left chamber 53 and a valve port 26. In reverse, fluid under pressure may be passed through the valve port 26, and valve port 25 to left chamber 50. When however, fluid under pressure is supplied through a valve port 27 to the right chamber 52 of the valve chamber 21, the piston 22 is moved toward the left toward engagement with the adjustable screw 24. During the time piston 22 is being moved toward the left, fluid within the left chamber 53 is being passed from the valve port 26 until the port 26 is closed by the piston 22. Subsequently, pressure fluid is passed from the valve port 25 to the left chamber 50 until the piston 22 is stopped by engagement with the adjustable screw 24.

Still referring to FIG. 2, further hydraulic connections may be noted. The left chamber 50 of the cylinder 7 is connected to the valve port 25 through a throttle valve 28, while the port 26 is connected to a port A of a first solenoid valve 30, and the valve port 27 is connected to a port B of a second solenoid valve 35. Similarly, while the right chamber 51 of cylinder 7 is connected to a port A of the solenoid valve 35, a port T of valve 35 is connected to a reservoir, and a port P of valve 35 is connected to a port B of the first solenoid valve 30. A port P of the first solenoid valve 30 is connected with a source of pressurized fluid, while a port T of valve 30 is connected to the reservoir through a check valve 40.

The operation of the chucking apparatus according to the present invention will now be described. The pot chuck 1 is initially stopped in a predetermined angular position by means of a stop mechanism, not shown, provided within the headstock 13. Thereafter, a change-over valve, not shown, is shifted, and pressurized fluid, supplied from the pressure source, enters the right chamber of the cylinder 18 (see FIG. 1). Depending upon the amount of pressurized fluid supplied the piston rod 16 is slidably moved toward the left, whereby the lever 14 is pivotably moved around the hinge pin 15 in a counterclockwise direction so as to thereby cause its upper portion to make contact with the lower end portion of the pressing member 11. After the pressing member 11 has been pivotably moved in a clockwise direction against the force of the springs 10, 10, due to the action of lever 14, a crank shaft W is loaded into the pot chuck 1, the journal portion $W_1$ of the crank shaft W being seated upon the bearing surface 4 of the pot chuck 1.

Referring now to FIG. 2, the first solenoid valve 30 is shifted to position I when a solenoid 32 is energized, and further, when a solenoid 36 is de-energized, the second solenoid valve 35 is likewise shifted to position I. Under these conditions, pressurized fluid, supplied from the pressure source, enters into the right chamber 51 of the cylinder 7 through the appropriate ports P and B, and P and A, of the first and second solenoid valves 30 and 35, respectively. Fluid within the left chamber 50 of the cylinder 7 is thus evacuated via the valve port 25 to the valve chamber 21, and exhausted through port 26 of valve 20 and through ports A and T of the first solenoid valve 30, and on through check valve 40 into the reservoir. At this time piston 6 is moved toward the left, whereby the clamp arm 2 connected with the piston rod 5 is pivotally moved relative to the hinge pin 3, whereby the journal portion $W_1$ of crank shaft W is clamped within the bearing surface 4.

Subsequently, when the solenoid 36 of the second solenoid valve 35 is energized, the solenoid valve 35 is shifted to position II. Fluid under pressure is thus supplied to the right chamber 52 of the valve chamber 21 through ports P and B, and P and B, of the first and second solenoid valves 30 and 35, respectively, and the valve port 27 of valve 20. Therefore, the piston 22 is moved within the valve chamber 21, from the position shown in FIG. 2, toward the left. When the piston 22 is moved further toward the left so as to close off the port 26, this occurring before the piston 22 reaches the abutment of the screw 24, fluid within the valve chamber 21 enters into the left chamber 50 of the cylinder 7 through the port 25 of valve 20 and through the throttle valve 28. Consequently, fluid within the right chamber 51 of the cylinder 7 is exhausted through ports A and T of the second solenoid valve 35 and into the reservoir. Piston 6 is thus slidably received within the cylinder 7 and is moved toward the right while the clamp arm 2 is pivotably moved about the hinge pin 3 in a counterclockwise direction. It is noted that the quantity of fluid entering into the left chamber 50 of cylinder 7 is one half the fluid capacity of chamber 53, such corresponding to the travel of piston 22 after commencing closing of the port 26 till engaging with the stop abutment of the adjustable screw 24. Therefore, the clamp arm 2 pivotably moves about pin 3 an extremely short distance, such as, for example, 0.2 mm. It is also to be appreciated that each of the throttle valves, 28 and 28a, effectuates to supply the fluid from the valve chamber 21 equally to the chambers 50 and 50a respectively, of the cylinders 7 and 7a, respectively.

As soon as the change-over valve not shown, connected to the cylinder 18 is shifted so as to reverse position, the piston 17 is moved toward the right so as to thereby move the lever 14 in a clockwise direction, the top portion thereof being disengaged from the pressing member 11. The pressing member 11 is, in turn, pivotably moved in a counterclockwise direction by the force of the springs 10, 10 so as to thereby contact the balancing weight portion $W_2$ of the crankshaft W. Accordingly, the reference plane formed upon the balancing weight $W_2$ is in pressurized engagement with the locating stop 8. In this state, the axis of the pin on the crankshaft is disposed in alignment with the axis of the spindle, not shown, whereby the crank shaft W is precisely located and ready for rotation about the common axis of the crank pin $W_3$ and the spindle. During this locating operation, the journal portion $W_1$ is not disengaged from the bearing surface 4 in the pot chuck 1 because the clearance imparted between the journal portion $W_1$ and the clamp arm 2 is extremely small. Furthermore, even if the journal portion $W_1$ is lifted or floated up from the bearing surface 4 by pressing member 11, no detrimental effect with respect to the accuracy of the locating operation, occurs because of the extremely small clearance.

After the crank pin is located in the predetermined position by rotating the journal portion $W_1$ relative to the bearing surface 4, the solenoid 36 of the solenoid valve 35 is deenergized to shift the valve to the position I. Pressurized fluid from the first solenoid valve 30 is then introduced into the right chamber 51 of the cylinder 7 through the second solenoid valve 35, via ports P and B, and P and A, of the solenoid valves 30 and 35 respectively, and serves to cause the piston 6 to move toward the left within cylinder 7. During this movement of the piston 6, fluid within the left chamber 50 of the cylinder 7 is being evacuated into the left chamber 53 within the valve 20 for moving the piston 22 toward the right. By this movement of the piston 22, fluid within the right chamber 52 within the valve chamber 21 is being exhausted through ports B and T of the second solenoid valve 35 into the reservoir. Accordingly, the clamp arm 2 is pivotably moved in a clockwise direction according to the movement of the piston 6 within the cylinder 7 toward the left such that the journal portion $W_1$ is clamped upon the bearing surface 4 formed so as to fit or mate with the periphery thereof. Thereafter, the pot chuck 1 and the crank shaft W are integrally rotated to have the pin portion $W_3$ thereof ground by a grinding wheel, not shown. When the grinding operation is completed, the pot chuck 1 is stopped, in a predetermined angular position by means of an indexing mechanism, not shown, cooperative with the spindle.

THe above-mentioned process being completed, the solenoid 36 is once again energized and the solenoid valve 35 is shifted from the position I to the position II. The first solenoid valve 30 is similarly shifted to the position II as a result of de-energization of the solenoid 32 and energization of the solenoid 31. Pressurized fluid supplied from the reservoir is then directed through ports P and A of the first solenoid valve 30 and through the port 26, the valve chamber 21, the port 25, and through the throttle valve 28 into the left chamber 50. The piston 6 mounted within the cylinder 7 is moved toward the right, whereby fluid within the right chamber 51 of the cylinder 7 is exhausted through ports A and T of the second solenoid valve 35 into the reservoir. The clamp arm 2 is thus pivotably moved in a counterclockwise direction per the movement of piston 6, so as to unclamp the journal portion $W_1$ of crank shaft W. In this state, pressurized fluid is introduced into the right chamber of the cylinder 18, the piston rod 16 causing the lever 14 to move pivotally in a counterclockwise direction so as to pivotably move the pressing member 11 in a clockwise direction so that it may be disengaged from the balancing weight portion $W_2$. Subsequently, the crank shaft W is unloaded from the pot chuck 1 having had the finish grinding operation performed upon the crank pin.

Thus, it may be seen that the chucking apparatus of the present invention has important advantages over the known prior art structures in that the balancing weight portion $W_2$ is urged toward the stop 8 by means of the pressing member 11, but the journal portion $W_1$ remains upon the bearing surface 4 without lifting therefrom. It is also readily apparent that the clamp arm 2 provided for clamping the journal portion $W_1$ upon the bearing surface 4 may be released from the journal portion $W_1$ with a very limited clearance. Under such conditions, even though the journal portion $W_1$ is floated up from the bearing surface 4, the amount of lift of the clamp arm 2 is small enough so as not to produce a prejudicial effect upon the accuracy of locating the crank pin. In addition, the reference plane is urged toward the locating stop 8 by compression springs 10, 10 so as to thereby obtain the high degree of accuracy in positioning the crank pin. Thus, the crank shaft is located, with a high degree of accuracy, in such a position that it is ready for rotation around the common axis of the crank pin and the spindle supporting the pot chuck.

Obviously, many modifications and variations of the present invention are possible in light of the above teachings. It is to be understood therefore, that within the scope of the appended claims, the present invention may be practiced otherwise than as specifically described herein.

What is claimed as new and desired to be secured by Letters Patent of the United States is:

1. Chucking apparatus for a machine tool comprising:
    a chucking body rotatably mounted upon said machine;
    said chucking body having a bearing surface for supporting a journal portion of a workpiece, the axis of which is aligned with the rotational center of said chucking body;
    a clamping arm for clamping said workpiece upon said bearing surface;
    hydraulic actuating means for operatively moving said clamping arm between a clamped and released position;
    hydraulic control means for supplying a predetermined quantity of fluid to said hydraulic actuating means;
    locating stop means provided within said chucking body for engaging a reference plane portion of said workpiece; and
    pressing means for rotatably urging said reference plane portion of said workpiece toward said locating stop means so as to locate the workpiece in a predetermined required position.

2. Chucking apparatus for a machine tool as set forth in claim 1, wherein said hydraulic control means additionally comprises:
    a fluid supply valve for supplying fluid to said hydraulic actuating means; and
    a change-over valve means for changing the direction of fluid to said hydraulic actuating means and said fluid supply valve.

3. Chucking apparatus for a machine tool as set forth in claim 2, wherein said fluid supply valve additionally comprises:
    a valve housing having a chamber therein;
    a piston member slidably mounted within said chamber for supplying fluid confined in said chamber to said hydraulic actuating means; and
    a spring for biasing the movement of said piston member within said chamber.

4. Chucking apparatus for a machine tool as set forth in claim 3, wherein said fluid supply valve further comprises:
- a screw stop member threadably engaged within said valve housing and extending into said chamber for controlling the quantity of fluid supplied to said hydraulic actuating means by limiting the stroke of said piston member.

5. Chucking apparatus for a machine tool as set forth in claim 1, wherein said pressing means additionally comprises:
- spring means for urging said reference plane formed upon said workpiece toward said locating stop means so as to accurately locate said workpiece.

6. Chucking apparatus for a mrchine tool as set forth in claim 1, which further comprises:
- disengaging means for disengaging said pressing means from said workpiece so that said workpiece may be unloaded from chucking apparatus.

* * * * *